United States Patent
Forghieri et al.

(10) Patent No.: US 8,682,175 B2
(45) Date of Patent: Mar. 25, 2014

(54) VARIABLE RATE TRANSPONDERS FOR OPTICAL COMMUNICATION SYSTEMS USING DIGITAL ELECTRIC FILTERS

(75) Inventors: Fabrizio Forghieri, Monza (MI) (IT); Luca Della Chiesa, Concorezzo (MI) (IT)

(73) Assignee: Cisco Technology, Inc., San Jose, CA (US)

( * ) Notice: Subject to any disclaimer, the term of this patent is extended or adjusted under 35 U.S.C. 154(b) by 1324 days.

(21) Appl. No.: 12/200,316

(22) Filed: Aug. 28, 2008

(65) Prior Publication Data
US 2010/0054750 A1 Mar. 4, 2010

(51) Int. Cl.
*H04B 10/00* (2013.01)
*H04B 10/04* (2011.01)

(52) U.S. Cl.
USPC ............ 398/162; 398/26; 398/27; 398/209

(58) Field of Classification Search
USPC ............ 398/154, 202–214, 25, 26, 27, 135, 398/137, 162
See application file for complete search history.

(56) References Cited

U.S. PATENT DOCUMENTS

| | | | |
|---|---|---|---|
| 6,694,104 B1* | 2/2004 | Caplan et al. | 398/197 |
| 7,826,752 B1* | 11/2010 | Zanoni et al. | 398/205 |
| 2004/0105410 A1* | 6/2004 | Fujimori et al. | 370/335 |
| 2008/0259968 A1* | 10/2008 | Forghieri et al. | 370/509 |
| 2009/0196602 A1* | 8/2009 | Saunders et al. | 398/26 |

OTHER PUBLICATIONS

Bosotti, et al., "Patent Prosecution in Italy", www.managingip.com, Dec. 1, 2004.*

* cited by examiner

*Primary Examiner* — Daniel Dobson

(57) ABSTRACT

For an optical network link, a receiving node monitors optical performance and upon determination of lowered optical performance for an extended period of time, the node can signal a transmitting node to lower bit transfer rate from a nominal bit transfer rate. The receiving node has a transponder which has a digital electronic variable bandwidth filter to process the digitized signals at the lowered bit transfer rate to increase the SNR of the signals. Optical performance of the link is optimized although at the lowered bit transfer rate.

21 Claims, 3 Drawing Sheets

VARIABLE RATE TRANSPONDERS FOR OPTICAL COMMUNICATION SYSTEMS USING DIGITAL ELECTRIC FILTERS

BACKGROUND OF THE INVENTION

The present invention is related to optical networks in general and, in particular, to receiver/transponders with variable bit transfer rate digital filters.

A present trend in telecommunications is the installation of optical networks with ever increasing data transfer rates. Optical networks in general allow high signal bandwidths, and multiple communications channels can be created over a single optical fiber with techniques, such as WDM (Wavelength Division Multiplexing) and its successor DWDM (Dense Wavelength Division Multiplexing). Current and proposed optical networks offer bandwidths of 10, 40, and even 100 Gbs (Gigabits per second). This rise in bit transfer rates is a consequence of not only technical development but also the burgeoning demand for the much anticipated applications of voice, computer data and video delivery with optical networks. For example, such applications include video-on-demand, such as Internet TV, amateur video blogs, and social networking video.

The current enthusiasm for ever-increasing optical performance overlooks a potential problem. The eventual aging and inevitable deterioration in performance of these networks have not been considered to any extent. Of course, one way of dealing with a declining network is to simply replace it. But this is a very expensive investment and a time-consuming operation.

An alternative is to keep the declining network in operation. In optical network design, the quality of performance is balanced against the costs of such performance as in any actual system. That is, among other considerations, the links of a network are designed with a particular bandwidth in mind. The definition or the shape of an optical signal naturally deteriorates as the signal travels along an optical fiber and as the bandwidth, i.e., the bit transfer rate rises, the definition of the optical signal deteriorates faster. Thus the network, depending upon the signal bandwidth, must place optical amplifiers at locations along the link to regenerate the signals before they deteriorate beyond recognition. As network components age, optical performance naturally falls. Steps must be taken to ensure that the network operates at its maximum capacity despite the declining performance.

The present invention is directed toward adapting optical networks for declining optical performance.

DETAILED DESCRIPTION OF THE INVENTION

Figure 1:
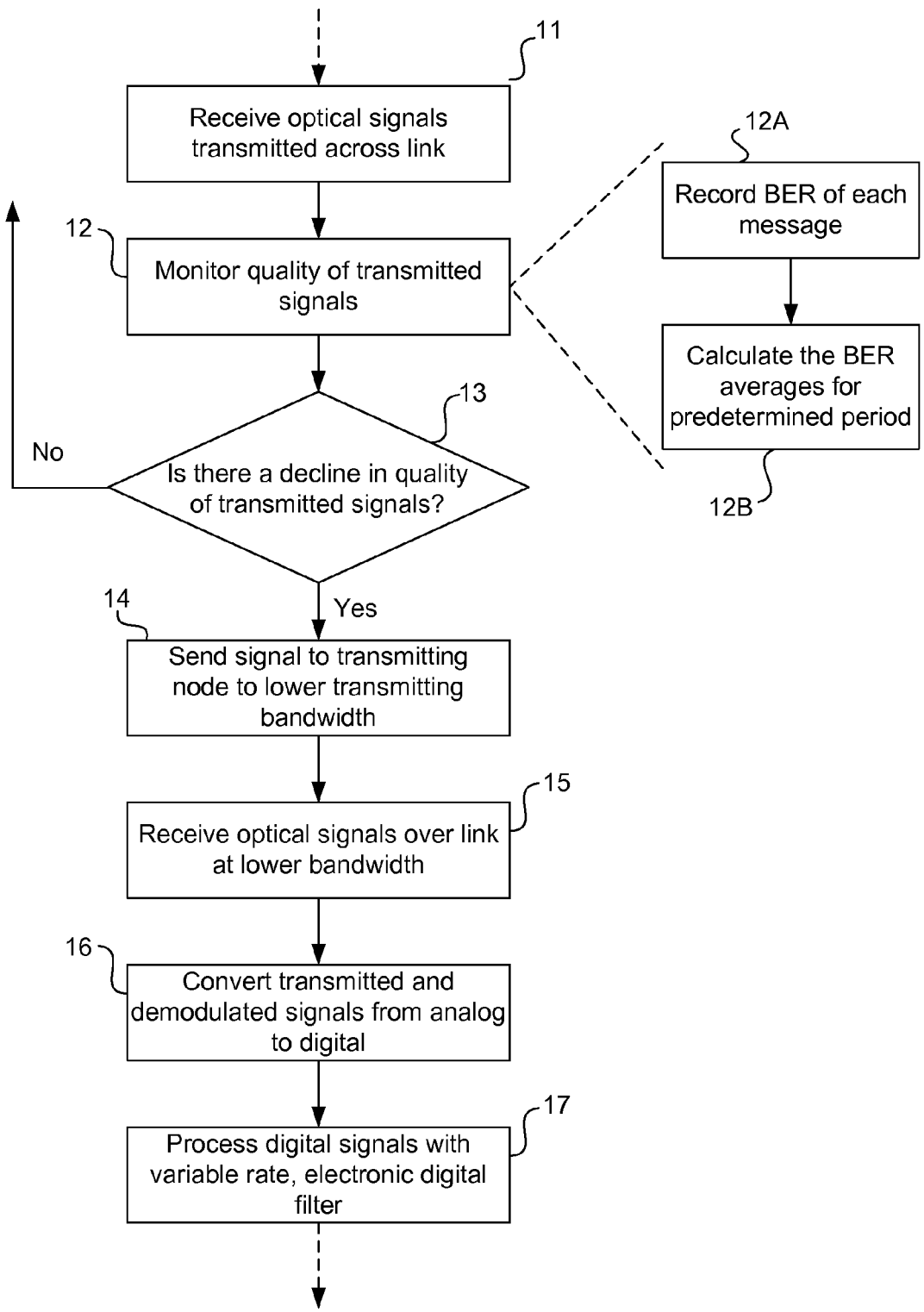
FIG. 1 is a flow chart of operations and steps to adapt an optical network to lowered optical performance, according to an embodiment of the present invention.

As the components of an optical network deteriorate under various effects, including wear and age, the optical performance of the network, as measured by the OSNR (Optical Signal-to-Noise Ratio) of the transmitted signals, fall. The OSNR is the optical signal-to-noise ratio (OSNR), the ratio of the optical signal power to the noise power. A simple relationship between information capacity, bandwidth and SNR (or in this case, OSNR) over a communications channel is:

$$I = B \log_2(1+\text{SNR}) = 3.32 B \log_{10}(\text{SNR})$$

where I is the information capacity (bps); B is the bandwidth (Hz) or bit transfer rate; and SNR is, of course, the signal-to-noise ratio. That is, the amount of data that a communications channel can transport per unit time is directly proportional to the product of the channel's bandwidth, the bit transfer rate, and the logarithm of the SNR of the channel. Thus as the OSNR of a link in an optical network falls, the information capacity of the link also falls if the bandwidth is kept constant.

In practice, a fall in the OSNR results in an increased BER (bit error rate), another measure of optical performance. As the signal strength falls with respect to the noise on the link, the number of errors as measured by the BER rises. The decline of the link can also be viewed as a reduction of the reach, the distance the optical signals can be transmitted along an optical fiber before the signals are irreparably degraded. But the network links have been installed with the higher optical performance and longer reach in mind. One measure to compensate for the decline in reach is to place regenerators in new locations of the link to compensate for the shortened reach. This permits the network to retain its bandwidth and its information capacity. But for the many optical network links, such as long distance links, it may be impractical or too costly to insert regenerators in the links to raise the OSNR of the signals. In one sense, the insertion of additional regenerators might be considered a half-way replacement of the network.

The present invention provides for an alternate way of handling declining optical performance in optical networks. The bandwidth of a network is lowered from its nominal bandwidth (and the reach of the network transmitters is maintained) in response to declining network performance so that network bandwidth, the transmission bit rate, is adapted to the available OSNR. Of course, though the decline in network performance can be due to component aging and stress, any network decline, such as channel interference and crosstalk from a network change, for example, can be addressed by a lowered bandwidth and the present invention.

According to an embodiment of the present invention, a record is maintained at one or more nodes of an optical performance parameter of received signals. The record tracks the BER, for example, of the received signals transmitted over each link to the node. If the record indicates an upward trend in the BER, i.e., a lowering OSNR, of the optical signals received over a subject link over an extended period, as distinguished from a short time failure, such as a straightforward component failure, the receiving node signals the transmitting node to lower its transmission bandwidth to adapt to the declining network performance.

FIG. 1 is a flow chart of general operations of a node for each optical signal message. The initial dotted arrow at the top of the drawing indicates that these operations are a part of ongoing node operations. In step 11, the node receives optical signals of a message across a link from a transmitting node. The receiving node in step 12 monitors the quality of transmission of the received signals. Step 12 includes the substeps 12A and 12B. In step 12A the BER for each message is recorded. In this example, the BER is used instead of other measurements of optical performance, such as the OSNR. The BER is convenient because it is typically used to monitor transmission quality in many optical network administration systems. In substep 12B the BER averages in one-hour periods are calculated. Of course, the BERs of messages with catastrophic failures, such as fiber cuts and network element failures, are not used to avoid skewing the averages from long-term trends, and the BERs described here are the bit error rates of messages prior to any error decoding, i.e., the BERs prior to any FEC decoding. Modern optical networks typically encode messages with error correction/detection codes before transmission, often termed forward error coding (FEC), to increase network performance and bit transfer rates.

Then step 13 determines whether there is a trend in the quality of transmission from the BER averages. If there is a monotonic decline in the averages over a period of several hours, i.e., $$\langle BER \rangle_{hour\_i} \geq \langle BER \rangle_{hour\ i+1}$$

for i=0 to 5, then a trend in optical performance decline has been found. Of course, other tests and other optical parameters may be used to determine a decline in network performance. With a determination of network performance decline, the receiving node signals to the transmitting node to transmit optical signals at a second bit transfer rate which is lower than the original bit transfer rate by step 14.

In step 15 the receiving node now receives signals at the second, lower transmission bandwidth. Step 16 represents the conversion of the received signals which have been demodulated into electrical analog signals from analog form into digital form.

The optical network nodes typically optically filter incoming signals, especially in WDM and DWDM networks, to isolate each particular communications channel over a link. Filtering at transmission bandwidth, i.e., bit transfer rate, is effectively performed by the electronic circuits of the nodes to filter out noise. Generally stated, the optical filter is used to separate channels and the electrical filtering is used to limit noise. The electronic hardware has limited bandwidth and acts, in effect, as an analog filter and optimizes optical performance of the channel, i.e., to increase the OSNR. But to handle the lowered bit transfer rate, step 17 uses an electronic digital filter, rather than an analog electronic filter, which processes the incoming signals after they have been converted from analog to digital form. The electronic digital filter is a variable rate filter to adapt to the declining bit transfer rate. Thus the noise is reduced as the bit transfer rate is reduced to maintain the SNR and optimize performance. The transmission rate is lowered for those links where the OSNR is lower by previous steps 14 and 15.

The node network operations continue at the new, lower bit transfer rate as indicated by the bottom dotted arrow from the step 17.

The use of a variable bandwidth electronic digital filter is counter to the natural and expected impulse toward a variable rate analog filter installed before the signals are converted from analog to digital form. Electronic analog filters are distributed widely in many electrical circuits, including those operating in optical networks, and are quite familiar to optical network designers and engineers. But such variable rate, analog filters are complex and expensive. The present invention uses an electronic digital filter which is relatively inexpensive compared to the variable bit electronic analog filter.

Figure 2A:
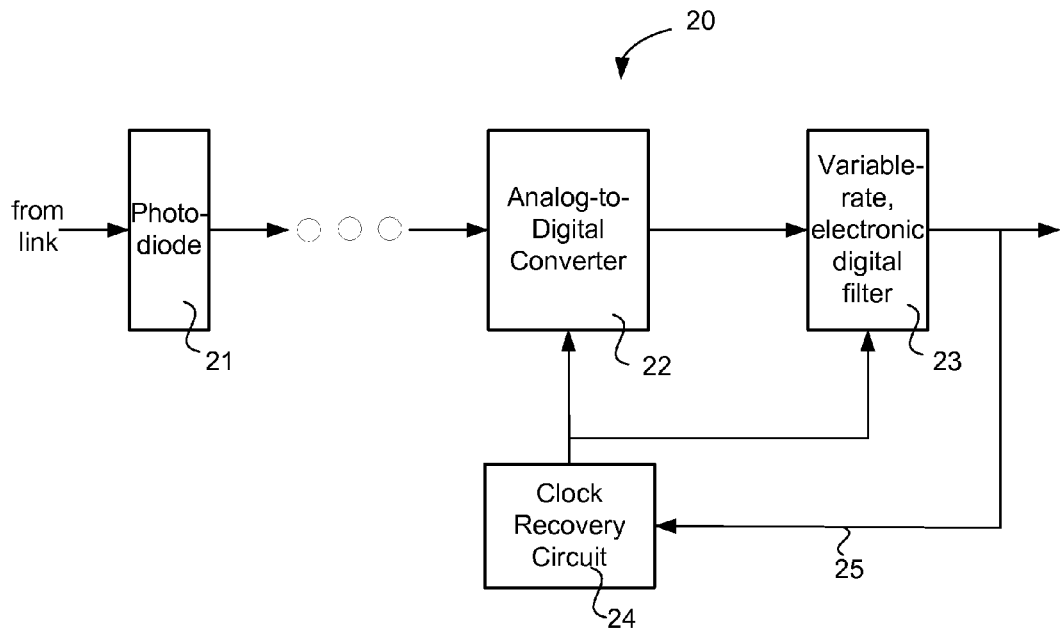
FIG. 2A is a general block diagram of a transponder with a variable digital filter according to one embodiment of the present invention.
Figure 2B:
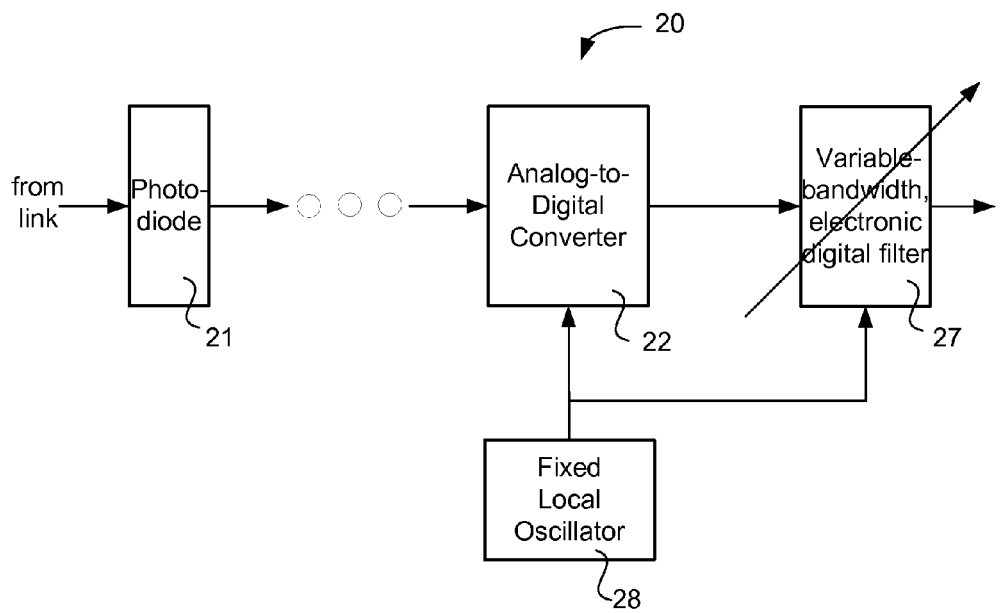
FIG. 2B is a block diagram of a transponder with a different timing arrangement according to another embodiment of the present invention.

FIGS. 2A and 2B illustrate general arrangements of a transponder 20 with different electronic digital filters, according to one embodiment of the present invention. The same reference numerals are used in these drawings for elements which have the same or nearly the same function or operation. The transponder 20 is part of a receiver for a network node and can be implemented on a card mounting the transponder components, allowing for easy insertion and removal of the transponder for easy repair and replacement of the network node equipment.

When optical signals transmitted over a network link are received by a node, they must be detected and demodulated by various pre-amplifier, filter (carrier frequencies), and threshold device elements. Only the initial conversion of the transmitted optical signals into electrical signals is shown in FIGS. 2A and 2B, as represented by the photodiode 21. More details of the detection and demodulation of the optical signals are not shown, modulation and demodulation techniques not being germane to the present invention. Returning to FIGS. 2A and 2B, after the signals are demodulated (as represented by the line of large dots), the resulting analog electrical signals are converted into digital signals with the analog-to-digital converter (ADC) 22.

In FIG. 2A an electronic digital filter 23 receives the output from the ADC 22 to filter its output stream of digits and to reduce noise as the bit rate is reduced. This raises the OSNR and maximizes the information capacity for the link at the reduced bit transfer rate. The transponder 20 also has a clock recovery circuit 24 which drives the sampling rate of the ADC 22 and of the digital filter 23. The clock recovery circuit 24 receives the demodulated signals and from them generates a clock signal corresponding to the bit transfer rate of the transmitted operation signals. Through a feedback loop 25 the clock recovery circuit 24 follows the bit transfer rate as it is lowered. Thus though the sampling rate of the ADC 22 and filter 23 varies objectively, it is constant relative to the bit transfer rate (at least twice the signal bandwidth to satisfy the Nyquist sampling theorem). The sampling rate is fixed to the bit transfer rate and the bandwidth of the digital filter automatically changes. The design of the filter does not need to be "tunable," per se.

Figure 3:
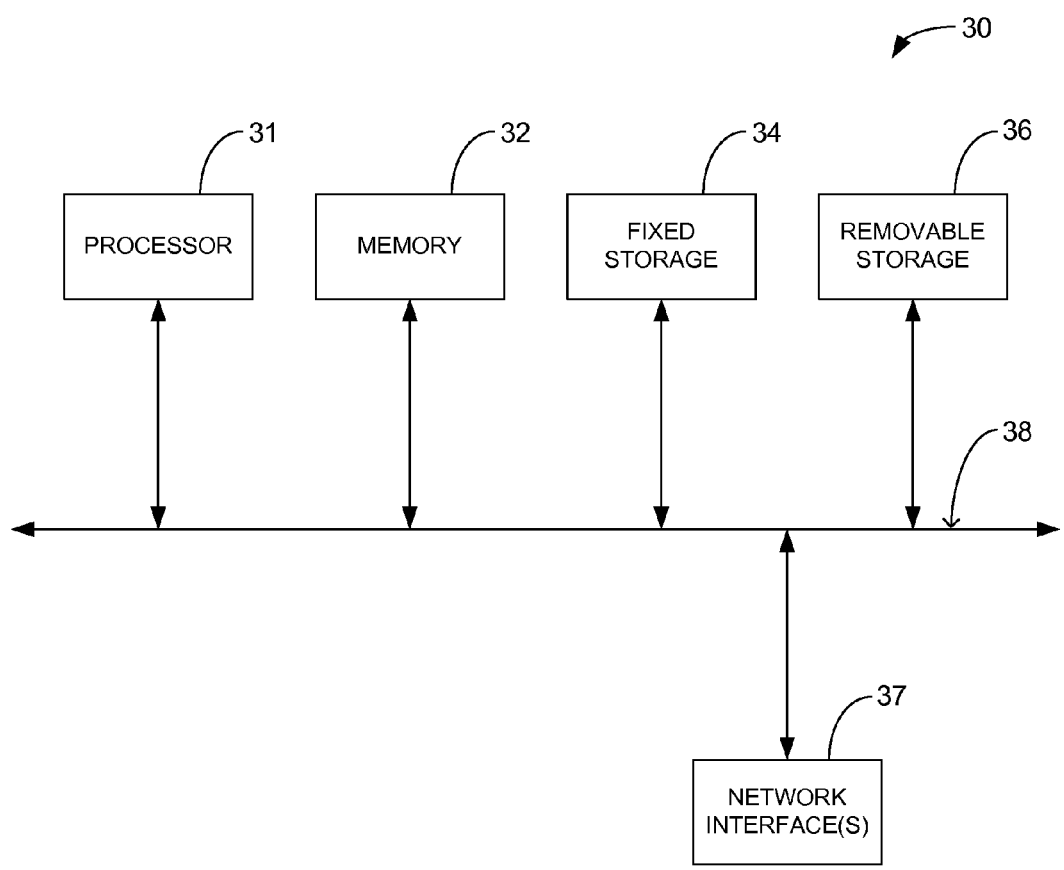
FIG. 3 illustrates a control unit for a network node, according to an embodiment of the present invention.

In FIG. 2B the transponder has a fixed local oscillator 28 that generates a clock signal independent of the bit transfer rate. The signal has a constant frequency which is at least twice that of original signal bandwidth to satisfy the Nyquist sampling theorem. The sampling rate is constant for the ADC 22 and digital filter 27. As the bit transfer rate is reduced, a higher sampling rate is achieved relative to the bit transfer rate and the digital filter bandwidth is reduced by modifying the coefficients, the weights, of each tap of the filter 27 responsive to the reduced bit transfer rate. A clock recovery circuit (not shown in FIG. 2B) located after the digital filter 27 tracks the bit transfer rate. A node control unit 30, such as illustrated in FIG. 3 and connected to the clock recovery circuit and the digital filter 27, determines when the bit transfer rate has reached the desired second bit transfer rate and modifies the filter coefficients accordingly. The filter coefficients can be set or calculated by the control unit 30 responsive to the expected value of the second bit transfer rate. This can be performed with a standard digital filter design. This variable bandwidth filter is indicated by the diagonal arrow through the rectangular box of the filter.

The control unit 30 for the node is shown in FIG. 3. Each network node operates under control units. The control unit 30 includes a memory subsystem 32 which can store and retrieve software programs incorporating computer code that implements aspects of the invention, data for use with the invention and the like and a central processor subsystem 31 which, among other functions, processes the instructions and data of the computer code. Example computer readable storage media for the memory 32 include semiconductor system memory preferably, CD-ROM, floppy disk, tape, flash memory, and hard drive. The control unit further includes subsystems, such as fixed storage 34 (e.g., hard drive), removable storage 36 (e.g., CD-ROM drive), and one or more network interfaces 37, all connected by a system bus 38. The network interface 37 provides a pathway for the node to communicate with the network management system and other nodes to synchronize operations. Additional or fewer subsystems in the control block may be used. For example, the control unit may include more than one processor 31 (i.e., a multi-processor system), or a cache memory.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of receiving signals across a link in an optical network, said optical link nominally carrying signals at a first bit transfer rate, said method comprising:
   receiving optical signals transmitted over said link;
   monitoring the quality of transmission of said optical signals on said link,
   determining whether said quality of transmission indicates a monotonic decline in optical performance over a plurality of predetermined time periods;
   signaling to a transmitting node to transmit optical signals at a second bit transfer rate lower than said first bit transfer rate if said determination is made;
   converting electrical signals demodulated from received optical signals into digital signals; and
   processing said digital signals with an electronic digital filter suitable for said second bit transfer rate to increase the SNR (signal-to-noise ratio) and optimize the BER (bit error rate) of signals received at said second bit transfer rate, thereby optimizing optical performance of said link at said second bit transfer rate.

2. The method of claim 1 wherein in said digital signals processing step, processing said digital signals with said electronic digital filter at the same rate with respect to said second bit transfer rate as said first bit transfer rate.

3. The method of claim 2 further comprising recovering a clock signal from said digital signals for timing said digital signal processing step.

4. The method of claim 3 wherein said clock signal in said clock signal recovering step times said digital signals processing step and said received signals converting step.

5. The method of claim 1 wherein in said digital signals processing step, processing said digital signals with said electronic digital filter at a rate independent of said second bit transfer rate.

6. The method of claim 5 further comprising generating a fixed rate clock signal independent of said second bit transfer rate.

7. The method of claim 6 wherein said clock signal in said fixed rate clock signal generating step times said digital signals processing step and said received signals converting step.

8. A method of receiving optical signals across a link in an optical network, said optical link nominally carrying optical signals at a first bit transfer rate, said method comprising:
   receiving optical signals over said link at a second bit transfer rate lower than said first bit transfer rate in response to determining that a monotonic decline in optical performance has occurred over a plurality of predetermined time periods;
   converting electrical signals demodulated from said received optical signals into digital signals; and
   processing said digital signals with an electronic digital filter suitable for said second bit transfer rate to increase the SNR (signal-to-noise ratio) and optimize the BER (bit error rate) of signals received at said second bit transfer rate, thereby optimizing optical performance of said link at said second bit transfer rate.

9. The method of claim 8 wherein in said digital signals processing step, processing said digital signals with said electronic digital filter at the same rate with respect to said second bit transfer rate as said first bit transfer rate.

10. The method of claim 9 further comprising recovering a clock signal from said digital signals for timing said digital signal processing step.

11. The method of claim 10 wherein said clock signal in said clock signal recovering step times said digital signals processing step and said received signals converting step.

12. The method of claim 8 wherein in said digital signals processing step, processing said digital signals with said electronic digital filter at a rate independent of said second bit transfer rate.

13. The method of claim 12 further comprising generating a fixed rate clock signal independent of said second bit transfer rate.

14. The method of claim 13 wherein said clock signal in said fixed rate clock signal generating step times said digital signals processing step and said received signals converting step.

15. An apparatus comprising:
   a receiver configured to:
      receive optical signals across a link in an optical network;
      monitor the quality of transmission of said optical signals on said link;
      determine whether said quality of transmission indicates a monotonic decline in optical performance over a plurality of predetermined time periods; and
      signal to a transmitting node to transmit optical signals at a second bit transfer rate lower than said first bit transfer rate if said determination is made;
   an ADC (analog-to-digital converter) converting electrical signals demodulated from said received optical signals into digital signals;
   an electronic digital filter processing said digital signals at a second bit transfer rate lower than said first bit transfer rate to increase the OSNR (optical signal-to-noise ratio) of signals received at said second bit transfer rate; and
   a clock circuit for timing said electronic digital filter, thereby optimizing optical performance of said link at said second bit transfer rate.

16. The transponder of claim 15 wherein said electronic digital filter processes said digital signals at the same rate with respect to said second bit transfer rate as said first bit transfer rate.

17. The transponder of claim 16 wherein said clock circuit recovers a clock signal from said digital signals for timing said electronic digital filter.

18. The transponder of claim 17 wherein said clock signal times electronic digital filter processing of said digital signals and said ADC converting.

19. The transponder of claim 15 wherein said electronic digital filter processes said digital signals at a rate independent of said second bit transfer rate.

20. The transponder of claim 19 wherein said clock circuit generates a fixed rate clock signal independent of said second bit transfer rate.

21. The transponder of claim 20 wherein said clock circuit times electronic digital filter processing of said digital signals and said ADC converting.

* * * * *